United States Patent [19]

Inui et al.

[11] 4,190,027
[45] Feb. 26, 1980

[54] ELECTRONIC SPARK TIMING ADVANCING APPARATUS

[75] Inventors: Tomoji Inui; Yasunori Mori, both of Katsuta; Seiji Suda; Toshio Furuhashi, both of Mito, all of Japan

[73] Assignee: Hitachi, Ltd., Japan

[21] Appl. No.: 836,956

[22] Filed: Sep. 27, 1977

[30] Foreign Application Priority Data

Sep. 29, 1976 [JP] Japan .................................. 51/115798

[51] Int. Cl.² .............................................. F02P 5/04
[52] U.S. Cl. .............................. 123/117 R; 123/117 D
[58] Field of Search ........ 123/117 R, 117 D, 119 ED, 123/148 E

[56] References Cited

U.S. PATENT DOCUMENTS

| 3,756,212 | 9/1973 | Schirmer et al. | 123/117 R |
|---|---|---|---|
| 3,785,356 | 1/1974 | Niemueller | 123/117 R |
| 3,815,560 | 10/1975 | Wahl et al. | 123/117 R |
| 3,875,912 | 4/1975 | Bullo | 123/117 R |
| 3,908,616 | 9/1975 | Sasayama | 123/117 D |
| 3,923,021 | 12/1975 | Stark | 123/117 R |
| 3,923,029 | 12/1975 | Polo | 123/117 R |
| 3,957,023 | 5/1976 | Peterson | 123/117 D |
| 4,020,807 | 5/1977 | Delzotto et al. | 123/117 R |
| 4,063,538 | 12/1977 | Powell et al. | 123/148 E |
| 4,085,714 | 4/1978 | Nattori et al. | 123/117 R |
| 4,131,097 | 12/1978 | Sawada et al. | 123/117 D |

Primary Examiner—Charles J. Myhre
Assistant Examiner—R. A. Nelli
Attorney, Agent, or Firm—Craig and Antonelli

[57] ABSTRACT

An electronic spark timing advancing apparatus for an internal combustion engine having an ignition device is disclosed, wherein a crank angle at which an internal pressure of a cylinder of the engine assumes a peak value is detected and a desired crank angle at which the internal pressure of the cylinder is to assume a peak value under a given condition is calculated in accordance with that condition, and a spark timing of the ignition device is controlled in response to a deviation therebetween to minimize the deviation.

11 Claims, 6 Drawing Figures

ELECTRONIC SPARK TIMING ADVANCING APPARATUS

LIST OF PRIOR ART REFERENCES (37 CFR 1.56(a))

The following references are cited to show the state of the art:

(1) Japanese Patent Application Kokai (Laid-Open) No. 50-153137, Dec. 9, 1975 Priority: British Patent Application No. 20148/74, Eric Harold Ford, May 7, 1974.

(2) Japanese Patent Application Kokoku (Post-Exam. Publn.) No. 46-3525, Hitachi Ltd., Jan. 28, 1971.

BACKGROUND OF THE INVENTION

The present invention relates to an electronic spark timing advancing apparatus of an internal combustion engine, and more particularly to an electronic spark timing advancing apparatus which provides an optimum spark timing advancement characteristic to the engine.

A prior art electronic spark timing advancing apparatus has been constructed to provide an optimum spark timing with respect to fuel consumption, exhaust gas and torque in accordance with an input signals such as rotation speed of the engine, manifold vacuum, temperature of cooling water or the like. Such a prior art apparatus, however, requires a complex function generator for determining an optimum spark timing in accordance with the input signals. Thus, when a sophisticated control is desired, the apparatus would be very expensive. Furthermore, because the apparatus does not function as a system to sense combustion state of the engine, a spark timing for an optimum combustion condition must be previously calculated. This requires considerable manpower and cost.

The Japanese Patent Application Kokai No. 50-153137 and Japanese Patent Application Kokoku No. 46-3525 disclose electronic spark timing advancing apparatus in which an internal pressure of a cylinder is sensed and an optimum crank angle at which the internal pressure of the cylinder is to assume a peak value under a normal operation is determined from a viewpoint that fuel consumption, exhaust gas and torque are maintained under best conditions in the normal operation, and a differential angle between the actual peak angle and the optimum peak angle of the internal pressure is fed back to control the spark timing so that the actual internal pressure assumes the peak value at the optimum crank angle. In this apparatus, the drawbacks described above have been overcome and the peak angle of the internal pressure is controlled to assure the optimum conditions of the fuel consumption, torque and exhaust gas under the normal operation. However, it had a drawback that much noxious exhaust gas is ejected under certain conditions such as rapid acceleration of the engine, warming-up of the engine or engine braking.

SUMMARY OF THE INVENTION

It is an object of the present invention to eliminate the drawbacks described above which were encountered in the prior art electronic spark timing advancing apparatus.

In accordance with the present invention, during the normal operation of the engine, a crank angle at which the internal pressure of the cylinder assumes a peak value is set to an optimum so that the fuel consumption, torque and exhaust gas are maintained at least conditions respectively, and under certain conditions such as rapid acceleration of the engine, wraming-up of the engine or engine braking, the crank angle at which the internal pressure assumes the peak value is controlled to reduce the noxious exhaust gas while paying primary attention to air pollution problem.

DETAILED DESCRIPTION OF THE INVENTION

Figure 1:
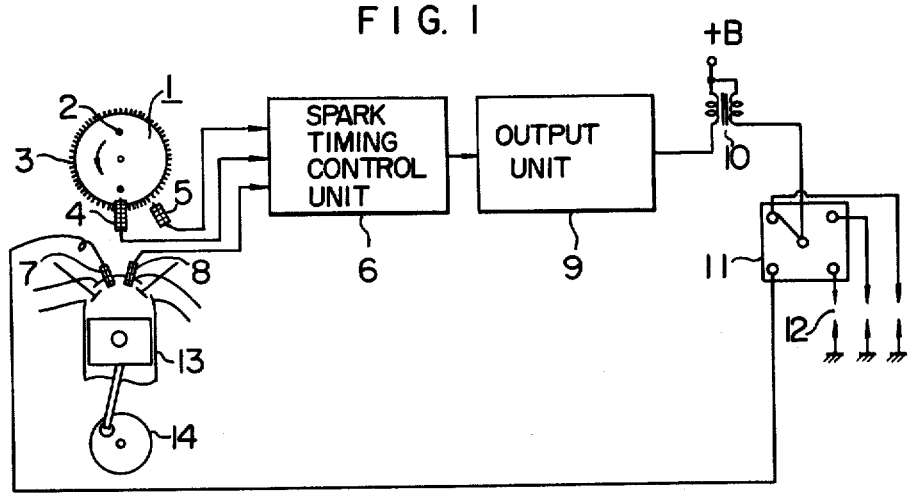
FIG. 1 shows a schematic view of an embodiment of an electronic spark timing advancing apparatus of the present invention.

FIG. 1 is a schematic view showing a typical embodiment of an electronic spark timing advancing apparatus of the present invention, which is implemented for a two-cycle, four-cylinder engine, as an example. A disk 1 attached to a crank shaft 14 of an engine having four cylinders 13 is provided with two projections 2 at 180° C. interval and a plurality of projections 3 at a pregiven interval, for example 1° interval. A pickup 4 interval for producing electrical signals detects the projections 2 and produces a reference signal J for each 180° revolution of the crank shaft, and a pickup 5 interval for producing electrical signals detects the projection 3 and produces an angle signal K indicating 1° revolution of the crank shaft. In the illustrated embodiment, the reference signal corresponds to a crank angular position when the piston of the associated cylinder reaches top dead center (TDC), but the pickup 4 may be arranged arbitrarily and the crank angular position at which the reference signal is produced (reference angular position) need not correspond to the top dead center. The angle signal is produced whenever the crank shaft is rotated by one degree after the reference signal has been produced so that the angular position of the top dead center relative to the reference angular position can be determined by the angle signal.

The angle signal and the reference signal are applied to a spark timing advancement control unit 6. A pickup 8 (piezoelectric element such as zircon lead titanate) arranged adjacent to an ignition plug 7 in the cylinder 13 for detecting the internal pressure of the cylinder to provide an electrical signal proportional to the internal pressure to the control unit 6, which in turn, determines an optimum advancement angle based on the angle signal, the reference signal and the internal pressure of the cylinder and applies that optimum value to an output unit 9. The output unit 9 includes an amplifier such as a power transistor to energize an ignition coil 10 which, in turn, selectively produces high voltage arcs at ignition plugs 7 and 12 through a distributor 11.

Figure 2:
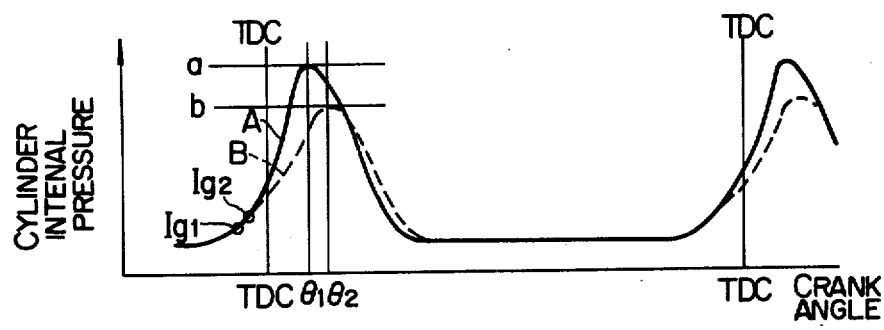
FIG. 2 shows pressure curves for the embodiment of the present invention.

FIG. 2 shows the change in the cylinder internal pressure, versus crank angle and it is referred to as an index pressure chart.

In FIG. 2, a characteristic curve A is plotted for the engine ignition at the time $I_{g1}$. It exhibits a maximum pressure a at a crank angle $\theta_1$. Here, the crank angle is defined as a rotation angle of the crank shaft after the piston has reached the top dead center. An optimum angular position for $\theta_1$ is determined by the engine per se and is not affected by the rotation speed of the engine or the loading conditions. In the prior art apparatus, the spark timing $I_{g1}$ has been controlled such that the peak of the pressure curve occurred at the crank angular position $\theta_1$ so that the fuel consumption, exhaust gas and torque conditions were optimum in the normal operation, and the crank angular position $\theta_1$ was determined in dependence on the spark timing $I_{g1}$. However, when the spark timing is controlled such that the pressure is always to a peak at the crank angular position $\theta_1$, much exhaust gas is ejected during rapid acceleration of the engine, warming-up of the engine and engine braking.

When the spark timing is retarded from $I_{g1}$ to $I_{g2}$, the peak of the pressure curve falls from the point a to a point b as shown by a characteristic curve B in FIG. 2, and the crank angular position at the peak is displaced to $\theta_2$. This displacement causes a reduction of the efficiency of the engine resulting in a reduction of the shaft torque, but also causes a reduction of the exhaust of $NO_x$ (nitrogen oxide) and a rise of the temperature of the exhaust gas. As a result of the rise of the temperature of the exhaust gas, HC (hydrocarbon) is re-burnt and the amount of exhaust thereof is reduced. Accordingly, an optimum operation will be attained by controlling the spark timing in the steady operation such that the pressure curve assumes the peak value at the crank angular position $\theta_1$ which is optimum from the viewpoints of fuel consumption, exhaust gas and torque, while controlling the spark timing in the rapid acceleration of the engine, warming up of the engine and engine braking such that the pressure curve assumes the peak value at the retarded crank angular position $\theta_2$ from the viewpoint of reducing the exhaust gas.

Figure 3:
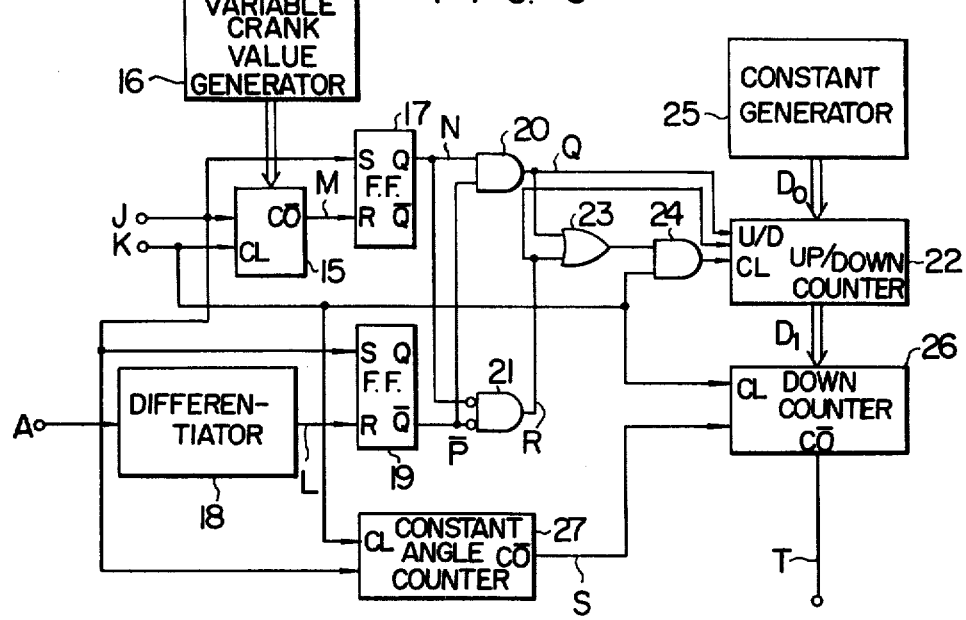
FIG. 3 shows a circuit diagram of a spark timing advancement control unit of the embodiment of the present invention.
Figure 4:
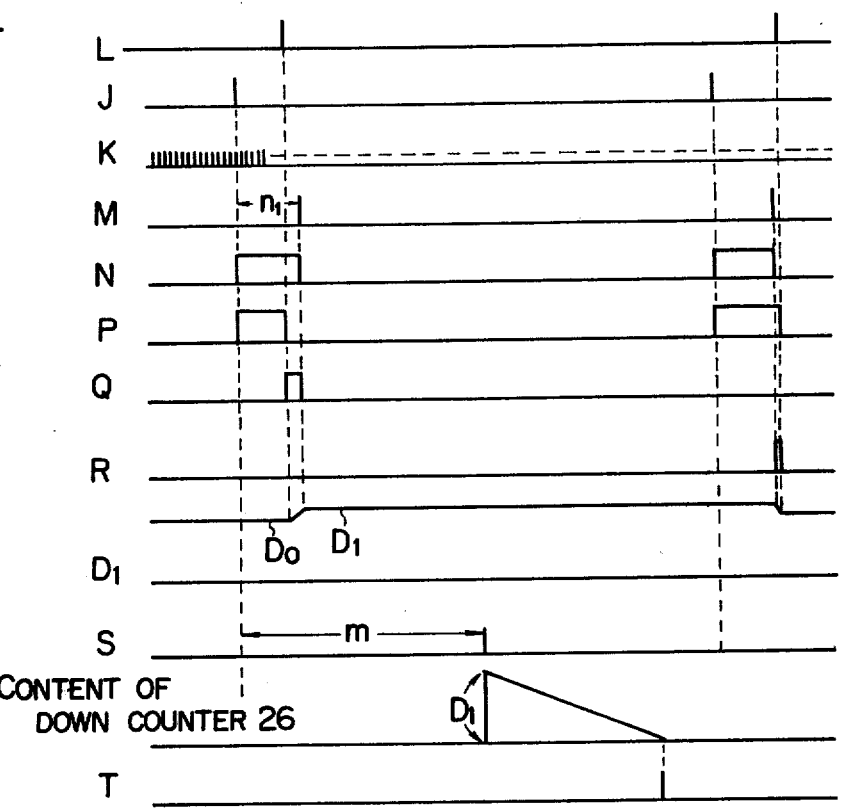
FIG. 4 shows a time chart illustrating waveforms at various portions of the spark timing advancement control unit.

FIG. 3 shows a detailed circuit diagram of the spark timing advancement control unit 6 shown in FIG. 1. It controls the spark timing so that the pressure curve assumes the peak at the crank angular position $\theta_1$ in the steady operation of the engine while the pressure curve assumes the peak at the crank angular position $\theta_2$ in the rapid acceleration of the engine, warming up of the engine and engine braking. FIG. 4 shows waveforms at various points in the control unit 6, in which the abscissa represents time. The crank angle may be measured from the angle signal K from the pickup 5.

A presettable counter 15 receives the reference signal J of 180° interval from the pickup 4 and the angle signal K of 1° interval from the pickup 5. The presettable counter 15 indicates the position (crank angle) at which the pressure curve shown in FIG. 2 is to assume the peak. The content to be set in the presettable counter 15 is a variable crank value $n_1$ (which corresponds to a desired crank angle at which the pressure curve is to assume the peak and indicates the angle measured from the reference signal) generated by a variable crank value generator 16, and $n_1$ may be a binary coded signal. When the reference signal J as shown in FIG. 4 is applied to the presettable counter 15, it stores the variable crank value $n_1$ from the variable constant generator 16 and decrements the value $n_1$ by one in response to the angle signal K (shown in FIG. 4), and when the content reaches zero, the presettable counter 15 produces an output signal M as shown in FIG. 4. Thus, the number of the angle signals K applied to the presettable counter 15 from the application of the reference signal to the issuance of the output signal M indicates the crank angle at which the pressure curve is to assume the peak, and the crank angle at the time when the signal M is produced indicates the desired crank angle at which the pressure curve is to assume the peak. The output signal M and the reference signal J are applied to reset input R and set input S, respectively, of a flip-flop 17, a Q output of which produces a pulse signal N (shown in FIG. 4). The crank angle at the fall of the pulse signal N represents the desired crank angle $G_1$ at which the pressure crank is to assume the peak.

On the other hand, the output of the pickup 8 which has a voltage waveform as shown by the pressure curve A is differentiated by a differentiation circuit 18 to produce an output signal L as shown in FIG. 4 at the crank angles corresponding to the poles of the pressure curve A. The crank angle at which the output signal L is produced indicates the angle at which the actual pressure curve assumes the peak. Thus, a difference between the crank angle indicated by the output signal L and the crank angle indicated by the output signal M represents a deviation angle, which is controlled to be sufficiently small in accordance with the present invention. The output signal L from the differentiation circuit 18 and the reference signal J are applied to reset input R and set input S, respectively, of an R-S flip-flop 19, a Q output of which produces a pulse signal P (shown in FIG. 4). The duration of the pulse signal P extends from the time point at which the crank is positioned at the reference angular position producing the reference signal to the time point at which the internal pressure actually reaches the peak, and the crank angle at the fall of the pulse signal P represents the crank angle at which the actual internal pressure reaches the peak. A difference between the crank angle at the fall of the pulse signal P and the crank angle at the full of the pulse signal N indicates a deviation angle of the crank angle at the actual peak from the crank angle at the command peak. An AND gate 20 and a NOR gate 21 constitute a portion of means for producing that deviation. The AND gate 20 receives the pulse signal N from the Q output of the flip-flop 17 and a pulse signal $\overline{P}$ from a $\overline{Q}$ output of the flip-flop 19 to produce a pulse signal Q having a duration corresponding to the difference between the durations of the pulse signals N and P (when the duration of the pulse signal N is longer than that of the pulse signal P). The NOR gate 21 receives the pulse signals N and $\overline{P}$ to produce a pulse signal R having a duration corresponding to the difference between the durations of the pulse signals N and P (when the duration of the pulse signal N is shorter than that of the pulse signal P). The pulse signal Q indicates the earlier occurrence of the peak than the desired angle and the pulse signal R indicates the delayed occurence of the peak from the desired angle, and the duration thereof indicates the deviation angle. It is a presettable up/down counter 22 that corrects an error of the crank angle to the target. When the pulse signal Q is applied, the content of the up/down counter 22 is set to $(D_o+kQ)$, where $D_o$ is an initial count, and when the pulse signal R is applied, the content of the up/down counter 22 is set to $(D_0-kR)$ so that the spark timing is changed to coincide with the command timing, where k is a coefficient to convert the durations Q and R of the pulse signals Q and R to the number of the angle signals K. This operation is attained by ORing the pulse signals Q and R shown in FIG. 4 by an OR gate 23 and gating the angle signals K (shown in FIG. 4) through an AND gate 24 to the presettable up/down counter 22 only for a period during which the OR gate 23 is open, that is, for a period during which the pulse signal Q or R is being applied. The initial count $D_o$ of the presettable up/down counter 22 shown in FIG. 4 is given by a constant generator 25. The count $D_o$ may be a binary number corresponding to a certain number of angle signals K, and it is incremented or decremented to $(D_o+kQ)$ or $(D_o-kR)$ depending on the deviation. More particularly, when the pulse signal Q is applied, the content $D_1$ of the counter 22 is incremented by the number of the angle signals K supplied from the AND gate 24 to reach $D_1=D_o+kQ$, and when the pulse signal R is applied, the content $D_1$ is decremented by the number of the angle signals K supplied from the AND gate 24 to reach $D_1=D_o-kR$, where k is a coefficient to convert the signal Q or R representing the time duration to the number of the angle signals K. The content $D_1$ thus incremented or decremented is applied to a presettable down counter 26, which functions to generate a spark timing signal T in response to a constant angle counter 27, which in turn has a content corresponding to a predetermined crank angle. When the reference signal J is applied to the constant angle counter 27, it starts to decrement the content thereof each time the angle signal K is applied to an CL input thereof. After m angle signals K, which m is determined in accordance with the predetermined crank angle, have been applied, the content of the counter 27 reaches zero, at which time the counter 27 produces a signal S to the counter 26. When the signal S is applied, the presettable down counter 26 stores the content $D_1$ of the up/down counter 22 and decrements the content each time the angle signal K is applied to an CL input thereof. When the content of the down-counter 26 reaches zero, it produces the spark signal T as shown in FIG. 4 to the output unit 9. The predetermined number m is determined depending on the initial count $D_o$ of the up/down counter 23 and it is determined such that the spark signal T is generated at the crank angle of the command peak in the normal operation when the content of the counter is $D_o$. The spark signal T functions to correct the deviation so that at the next ignition cycle the spark occurs at a correct position, that is, at a position at which the crank angle for the peak pressure corresponds to the desired crank angle preset by the variable constant generator 16. If the spark timing thereafter deviates from the command value, it is automatically corrected by a negative feedback loop. The desired crank angle at which the pressure curve is to assume the peak is determined by the preset count of the presettable down counter 15, which preset count is given by the variable constant generator 16, as described above. This will be explained below in further detail.

Figure 5:
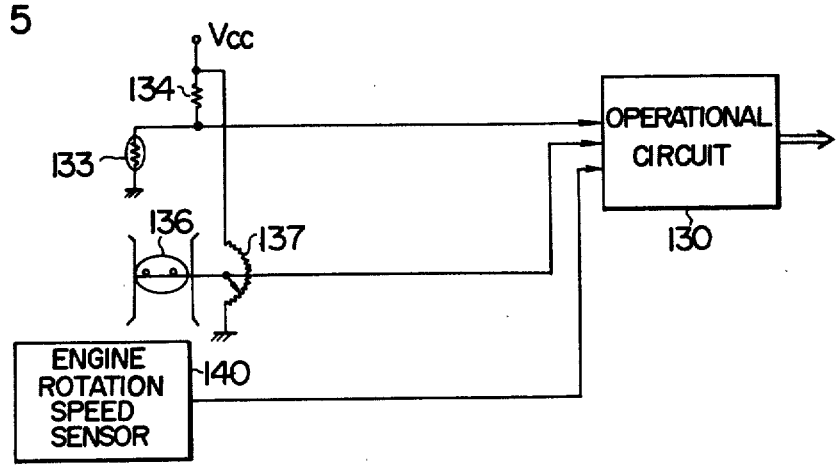

FIG. 5 is a block diagram illustrating the detail of an embodiment of the variable constant generator 16.

The temperature of the engine cooling water is sensed as a resistance of a thermistor 133 and a fraction of a power supply voltage Vcc divided by the thermistor 133 and a resistor 134 is applied to an operational circuit 130 as a first analog signal. An aperture of a throttle 136 is sensed by a potentiometer 137 as a voltage proportional to the aperture, and the voltage sensed is applied to the operational circuit 130 as a second analog signal. An engine rotation speed sensor 140 senses the rotation speed of the engine and applies a third analog signal proportional to the rotation speed of the engine to the operational circuit 130. The operational circuit 130 handles the first, second and third analog signals in a predetermined manner and determines whether the engine is in the steady state or at least one of the rapid acceleration state, the warming-up state and the engine braking state. When the steady state of the engine is determined, it produces a signal representing the number of the angle signals corresponding to the crank angle $\theta_1$ as the binary signal $n_1$ such that the internal pressure of the cylinder assumes the peak at the crank angle $\theta_1$, and when one of the rapid acceleration state, the warming-up state and the engine braking state is determined, it produces a signal representing the number of the angle signal K corresponding to the crank angle $\theta_2$ as the binary signal $n_1$ such that the internal pressure of the cylinder assumes the peak at the crank angle $\theta_2$.

In this manner, during the warm-up state of the engine, the crank angle for the peak pressure is retarded from the normal so that the exhaust gas temperature is raised to rapidly warm up the engine and reduce the exhaust of HC. During the rapid acceleration of the engine, the crank angle for the peak pressure is also retarded to reduce the peak value so that the exhaust of $NO_x$ is suppressed. Further, during engine braking, the crank angle for the peak pressure is also retarded to reduce the exhaust of HC.

Figure 6:
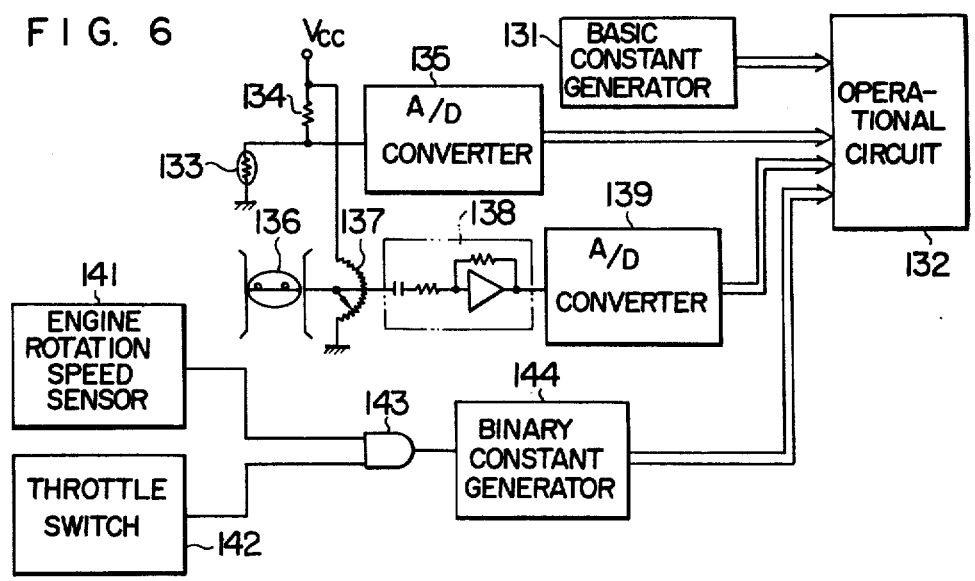
FIGS. 5 and 6 show schematic views of embodiment of variable crank value generator used in the embodiment of the present invention.

FIG. 6 is a block diagram which shows the detail of another embodiment of the variable constant generator 16. Like numerals to those in FIG. 5 show like parts. A basic constant generator 131 produces a signal representing the number of the angle signals K corresponding to the desired crank angle $\theta_1$ at which the internal pressure is to assume the peak in the steady operation, to an operational circuit 132 as a binary number $n_o$. A temperature of engine cooling water is sensed by a thermistor 133 as a first analog signal, which is converted by an A/D converter 135 to a first binary signal, which in turn is applied to the operational circuit 132. An aperture of a throttle 136 is sensed by a potentiometer 137 as a voltage proportional to the aperture, which voltage is applied to a differentiation circuit 138, an output of which is proportional to the abruptness of opening of the throttle 136 and is converted by an A/D converter 139 to a second binary signal, which in turn is applied to the operational circuit 132. An engine rotation speed sensor 141 senses when the rotation speed of the engine is equal to or above a given speed to produce an output signal. On the other hand, throttle switch 142 senses when the throttle is fully closed to produce an output signal. Both output signals are applied to an AND gate 143 so that the engine braking state is detected when the AND gate 143 produces an "1" output, which in turn actuates a binary constant generator 144 such as a one-bit ROM to produce a third binary signal, which is applied to the operational circuit 132.

The operational circuit 132 determines the warm-up state of the engine when the first binary signal is equal to or below a given value to modify the binary signal $n_o$ from the basic constant generator 131 for producing a signal representing the number of the angle signals K corresponding to the crank angle $\theta_2$ as the binary signal $n_1$. When the second binary signal is equal to or above a given value, the operational circuit 132 determines the rapid acceleration state, and when the third binary signal is applied, it determines the engine braking state, and in both cases the operational circuit 132 produces a signal representing the number of the angle signals K corresponding to the crank angle $\theta_2$ as the binary signal $n_1$. In other cases, the operational circuit 132 determines the steady operation state and produces the binary signal $n_o$ from the basic constant generator 131 as the binary signal $n_1$.

In this manner, during the warm-up state of the engine, the crank angle for the peak pressure is retarded from the normal so that the temperature of the exhaust gas is raised to rapidly warm up the engine and reduce the exhaust of HC. During the rapid acceleration of the engine, the crank angle for the peak pressure is also retarded to reduce the peak value so that the exhaust of $NO_x$ is suppressed. Further, during engine braking state, the crank angle for the peak pressure is also retarded to reduce the exhaust of HC.

While the digital implementation of the present invention has been shown and described, it should be readily understood to those skilled in the art that the present invention may be implemented in an analog system.

We claim:

1. An electronic spark timing advancing apparatus for an internal combustion engine including an ignition device, comprising:

first means for sensing the crank rotation angle of the engine;

second means for sensing the cylinder internal pressure of the engine;

third means for detecting the crank angle at which the internal pressure sensed by said second means reaches a peak value in accordance with the crank angle sensed by said first means and generating a crank angle signal representative thereof;

fourth means for generating a first command signal representative of a first crank angle at which the cylinder internal pressure is to assume a first peak value under a first set of given conditions including at least one of the conditions of rapid acceleration of the engine, warm-up of the engine and engine braking, and for generating a second command signal representative of a second crank angle at which the cylinder internal pressure is to assume a second peak value under a second set of given conditions comprising a steady state operation of the engine, and for supplying one of said first and second command signals to an output thereof depending upon the corresponding one of said first and second sets of given conditions under which the engine is operating;

fifth means for detecting a deviation between the crank angle signal provided by said third means and the one of said first and second command signals supplied at the output of said fourth means; and sixth means, responsive to the deviation detected by said fifth means, for controlling the spark timing of said ignition device to minimize and said deviation.

2. An electronic spark timing advancing apparatus according to claim 1, wherein said fourth means includes seventh means for sensing the temperature of engine cooling water, eighth means for sensing the aperture of a throttle valve, ninth means for sensing the rotation speed of the engine, and an operational circuit responsive to the outputs of said seventh through ninth means to calculate said command crank angles.

3. An electronic spark timing advancing apparatus according to claim 2, wherein said seventh means includes a temperature sensor for sensing the temperature of the engine cooling water to produce a first signal proportional to the water temperature; said eighth means includes a throttle aperture sensor for sensing the aperture of the throttle valve of the engine to produce a second signal proportional to the aperture; said ninth means includes a rotation speed sensor for sensing the rotation speed of the engine to produce a third signal proportional to the rotation speed; and said operational circuit includes means to calculate said common crank angles in accordance with said first through third signals.

4. An electronic spark timing advancing apparatus according to claim 3, wherein said temperature sensor includes a thermistor.

5. An electronic spark timing advancing apparatus according to claim 2, wherein said fourth means further includes tenth means for defining a reference crank angle at which the cylinder internal pressure is to assume the peak value when the engine is in the steady operation state, and said operational circuit is responsive to the outputs of said seventh to ninth means to modify said reference crank angle to provide the result as said command crank angle.

6. An electronic spark timing advancing apparatus according to claim 5, wherein said seventh means includes a temperature sensor for sensing the temperature of the engine cooling water to produce a first analog signal proportional to the water temperature and a first A/D converter for converting said first analog signal to a first digital signal; said eighth means includes a throttle aperture sensor for sensing the aperture of the throttle valve of the engine to produce a second analog signal proportional to the aperture and a second A/D converter for converting said second analog signal to a second digital signal; said ninth means includes a rotation speed sensor for sensing when the rotation speed of the engine reaches a predetermined rotation speed to produce a fifth signal, a throttle sensor for sensing the closed state of the throttle to produce a sixth signal, and logical means responsive to said fifth and sixth signals to produce a third digital signal; said tenth means is adapted to produce said reference crank angle as a fourth digital signal; and said operational circuit is adapted to be responsive to said first, second and third digital signals to modify said fourth digital signal to provide the result as said command crank angle.

7. An electronic spark timing advancing apparatus according to claim 6, wherein said temperature sensor includes a thermister.

8. An electronic spark timing advancing apparatus according to claim 3, wherein said first means produces a second signal indicative of said reference crank angle of the crank shaft and produces a third signal each time said crank shaft rotates by a predetermined angle from said reference crank angle; said third means includes eleventh means for producing a fourth signal when the internal pressure sensed by said second means assumes the peak value and twelveth means for producing a first pulse which pertains from the issuance of said second signal to the issuance of said fourth signal; said fourth means includes thirteenth means for producing a second pulse which pertains from the issuance of said second signal to the time at which the number of said third signals reaches the number corresponding to said command crank angle; and said fifth means is adapted to compare the duration of said first pulse with the duration of said second pulse to produce a difference therebetween as said deviation.

9. An electronic spark timing advancing apparatus according to claim 8, wherein said twelveth means comprises a first flip-flop having a Q output and a $\overline{Q}$ output, said first flip-flop being set in response to said second signal and reset in response to said fourth signal to produce said first pulse; said thirteenth means includes a first counter having a content corresponding to said target crank angle of said operational circuit and producing a fifth signal when the number of said third signals produced after the issuance of said second signal reaches the number corresponding to said command crank angle, and a second flip-flop having a Q output and a $\overline{Q}$ output and being set in response to said second signal and reset in response to said fifth signal to produce said second pulse; said fifth means includes an AND gate for receiving the $\overline{Q}$ output of said first flip-flop and the Q output of said second flip-flop to produce a third pulse having a duration equal to a differential duration between said first pulse and said second pulse and a NOR gate for receiving the $\overline{Q}$ output of said first flip-flop and the Q output of said second flip-flop to produce a fourth pulse having a duration equal to a differential duration between said first pulse and said second pulse; and said sixth means includes an up/down counter having a preset count and being adapted to increment the content by the number of said third signals produced during the presence of said third pulse and decrement the content by the number of said third signals produced during the presence of said fourth pulse and a third counter for decrementing the content of said up/down counter in response to said third signal a predetermined time after the issuance of said second signal and producing a spark signal when the content thereof reaches zero.

10. An electronic spark timing advancing apparatus according to claim 6, wherein said first means produces a second signal indicative of said reference crank angle of the crank shaft and produces a third signal each time the crank shaft rotates by a predetermined angle from said reference crank angle; said third means includes eleventh means for producing a fourth signal when the internal pressure sensed by said second means assumes the peak value and twelveth means for producing a first pulse having a duration which pertain from the issuance of said second signal to the issuance of said fourth signal; said fourth means includes thirteenth means for producing a second pulse having a duration which pertains from the issuance of said second signal to a time point at which the number of said third signals reaches the number corresponding to said command crank angle; and said fifth means compares the duration of said first pulse with the duration of said second pulse to produce a difference therbetween as said deviation.

11. An electronic spark timing advancing apparatus according to claim 10, wherein said twelveth means includes a first flip-flop having a Q output and a $\overline{Q}$ output, said first flip-flop being adapted to be set in response to said second signal and reset in response to said fourth signal to produce said first pulse; said thirteenth means includes a first counter having the number corresponding to said command crank angle from said operational circuit as a content thereof and producing a fifth signal when the number of said third signals after the issuance of said second signal reaches the number corresponding to said command crank angle and a second flip-flop having a Q output and a $\overline{Q}$ output and being adapted to be set in response to said second signal and reset in response to said fifth signal to produce said second pulse; said fifth means includes an AND gate for receiving the $\overline{Q}$ output of said first flip-flop and the Q output of said second flip-flop to produce a third pulse having a duration equal to a differential duration between said first pulse and said second pulse and a NOR gate for receiving the $\overline{Q}$ output of said first flip-flop and the Q output of said second flip-flop to produce a fourth pulse having a duration equal to a differential duration between said first pulse and said second pulse; and said sixth means includes an up/down counter having a preset count and being adapted to increment the content by the number of said third signals produced during the presence of said third pulse and decrement the content by the number of said third signals produced during the presence of said four pulse and a third counter for decrementing the content of said up/down counter in response to said third signal a predetermined time after the issuance of said second signal and producing a spark signal when the content thereof reaches zero.

* * * * *